Dec. 14, 1926.
P. J. SWANSON
1,610,633
MAT MAKING MACHINE
Filed Dec. 21, 1925    3 Sheets-Sheet 2
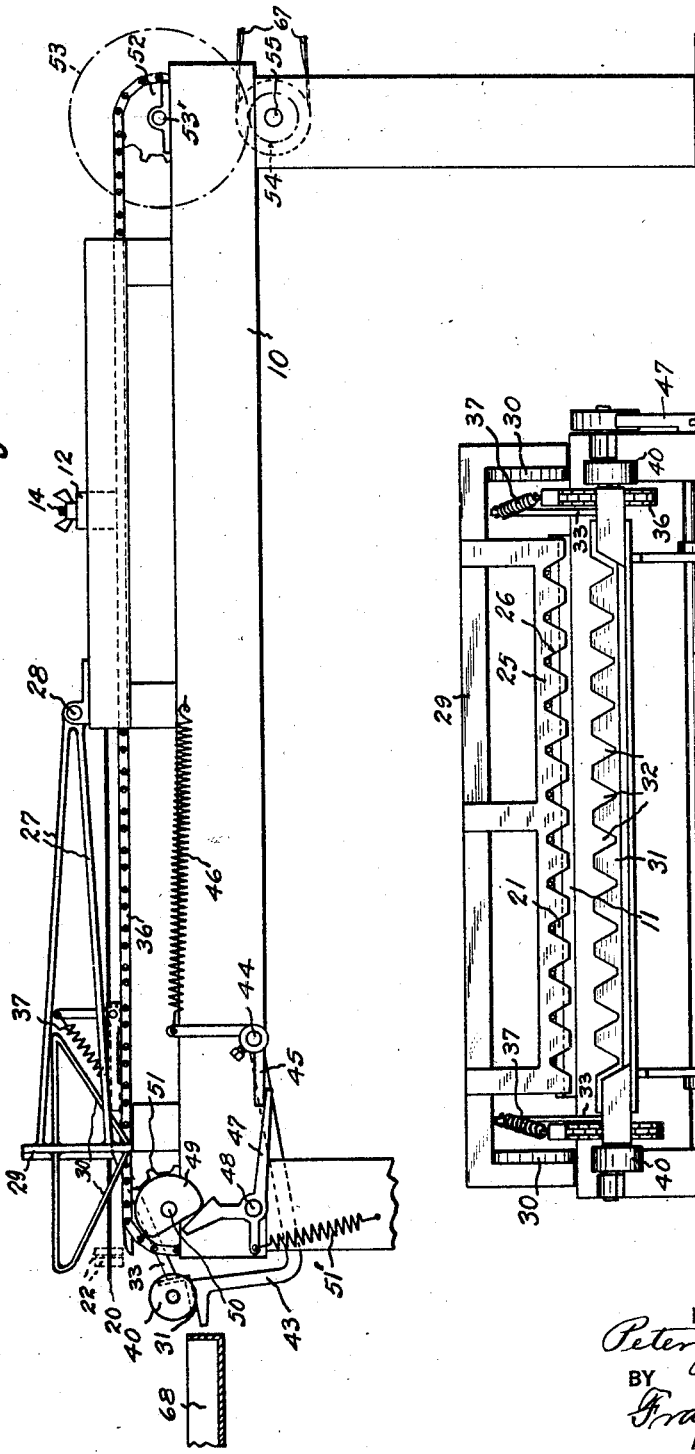
INVENTOR
Peter J. Swanson
BY
Frank Warren
ATTORNEY Dec. 14, 1926.  
P. J. SWANSON  
1,610,633  
MAT MAKING MACHINE  
Filed Dec. 21, 1925   3 Sheets-Sheet 3

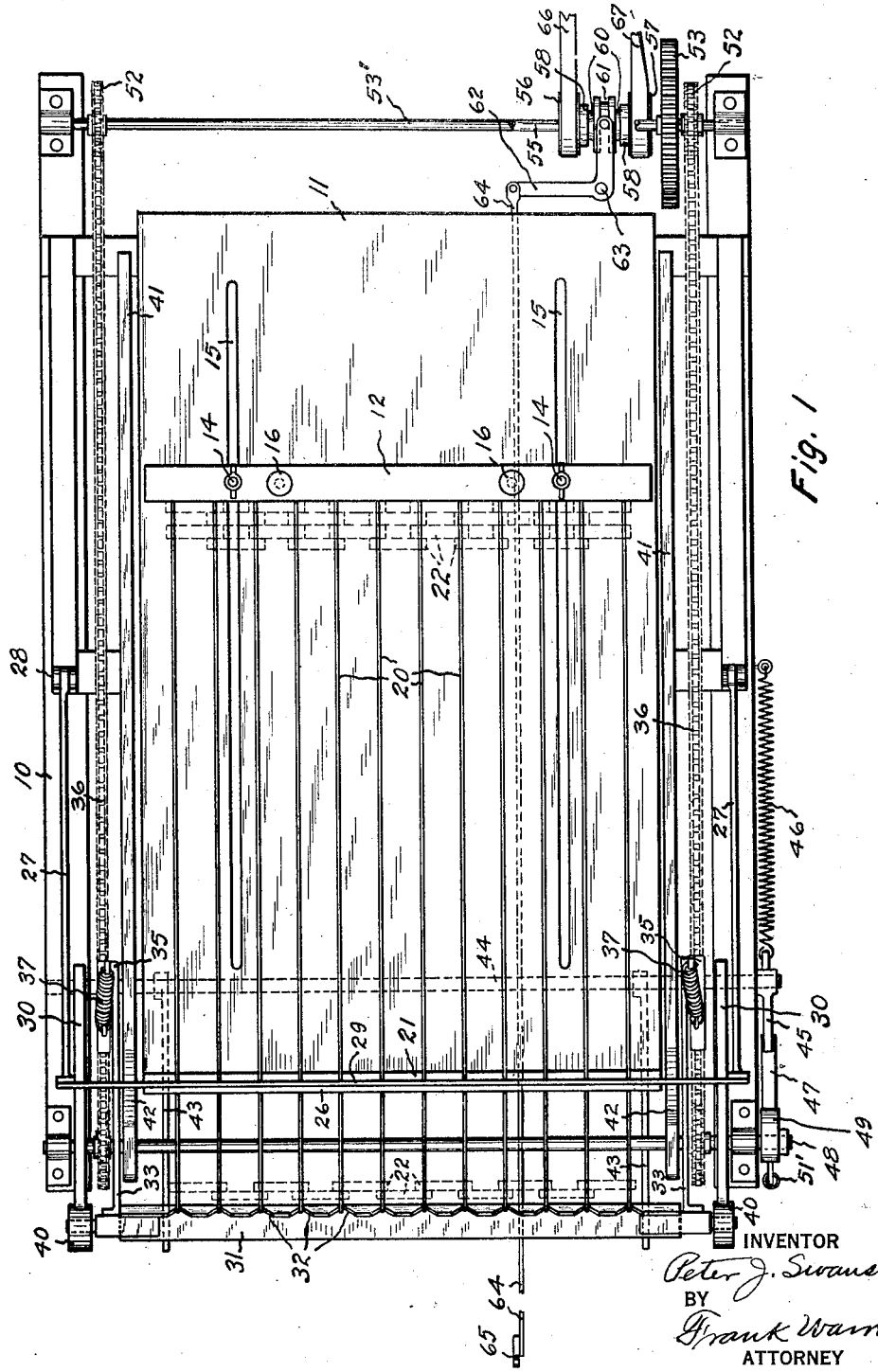

INVENTOR  
Peter J. Swanson  
BY  
Frank Warren  
ATTORNEY

Patented Dec. 14, 1926.

1,610,633

UNITED STATES PATENT OFFICE.

PETER J. SWANSON, OF SEATTLE, WASHINGTON.

MAT-MAKING MACHINE.

Application filed December 21, 1925. Serial No. 76,927.

My invention relates to improvements in mat making machines and the object of my invention is to provide a machine for use in making rubber mats of the form in which a multiplicity of rubber blocks are assembled in overlapping edgewise position on a plurality of parallel straight wires.

Another object of the invention is to provide a machine of this nature that is strong and simple in construction, reliable and efficient in operation and that is adated to be power driven thereby relieving the operator of needless labor.

Another object of the invention is to provide a machine of this nature that is semi-automatic in its operation, that will relieve the operator of all possible work in assembling the rubber blocks and that will greatly speed up the work of making the mats.

A further object of the invention is to provide a mat making machine of this nature that is adapted for making mats of various sizes.

Other and more specific objects will be apparent from the following description taken in connection with the accompanying drawings.

In the drawings Figure 1 is a plan view of a mat making machine constructed in accordance with my invention, certain rubber blocks used in making up a mat being shown by dotted lines.

Fig. 2 is a side elevation of the same.

Fig. 3 is an end elevation of the same.

Like reference numerals designate like parts throughout the several views.

Figure 4:
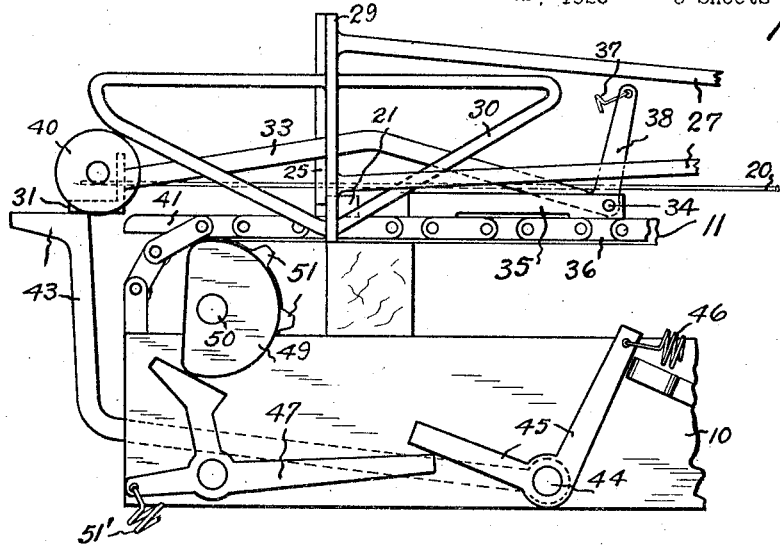
Fig. 4 is a side elevation on a larger scale of a fragment of one end of the machine showing parts in a different position from that shown in Fig. 2.

In the drawings I show a frame 10 whereon is mounted a platform or table 11 upon which the mats are assembled.

Figures 6, 7, 8:
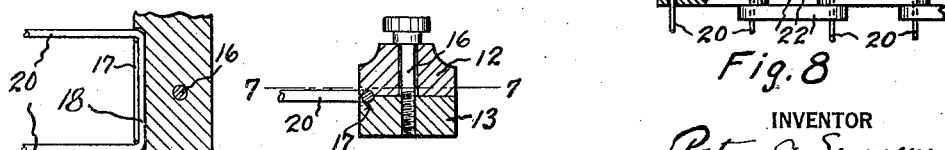
Figs. 6 and 7 are fragmentary sectional views illustrating a wire holding bar embodied in the invention and Fig. 8 is a plan view of a fragment of a mat constructed in accordance with my invention.

The table 11 is provided with a transverse wire holding bar, preferably formed of two pieces 12 and 13, see Figs. 6 and 7, that is adjustable lengthwise of said table by means of bolts 14 that are operable in slots 15 which extend longitudinally of the table. The members 12 and 13 forming the wire holding bar are adapted to be clamped together by screw bolts 16 and are provided near their forward edges with grooves 17 that are adapted for the reception of the U shaped ends 18 of parallel wires 20 on which the mats are assembled. The wire holding bar being adjustable lengthwise of the table 11 may be suitably positioned for making a mat of any desired length within the limits of the length of table 11.

The wires 20 extend forwardly in parallel relation as shown in Fig. 1 and project over the front end of the machine. A transverse strip 21, preferably of soft material, is provided at the front edge of the table 11 to support the forward ends of wires 20 in spaced relation above said table sufficient to accommodate certain blocks 22 which are used in forming a mat.

The rubber blocks 22, see Fig. 8, are preferably formed from discarded pneumatic vehicle tires which are cut out and are of substantially uniform shape and size and are formed with rounded ends 23 and have transverse perforations 24 adjacent said ends that are adapted to slip over the wires 20. In assembling the blocks 22 on the wires 20, one wire is inserted through each end of each block so that each block is held on two wires. Blocks are thus placed to form a transverse row crosswise of the wires. The next adjacent row of blocks is placed on alternate pairs of wires and the placing of the successive rows of the blocks thus proceeds until the entire mat is made up.

Figure 5:
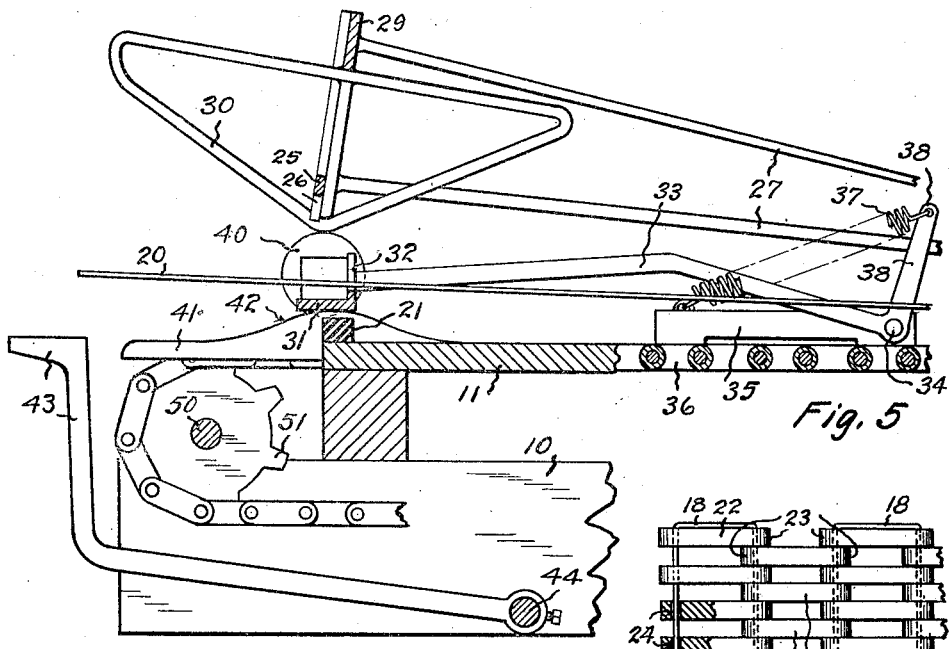
Fig. 5 is a fragmentary view partly in section and partly in elevation similar to Fig. 4 except that the parts are shown in a different operative position.

The ends of the wires 20 are held at the proper distance apart to facilitate easy placing of the blocks 22 thereon by means of spacing gate 25, see Fig. 3, having V shaped notches 26 extending from the bottom edge upwardly and adapted to fit over said wires when said gate is lowered. The spacing gate 25 is secured to a frame 29 that is connected by bracket arms 27 with pivots 28 on the frame 10 so that said gate may be lowered as shown in Figs. 1, 2, 3 and 4 or may be raised as shown in Fig. 5. Cams 30 are provided for raising the gate 25 as hereinafter described.

The gate 25 is positioned just in front of the wire rest 21.

For the purpose of moving the blocks 22 toward the rear end of the wires 20 after said blocks have been placed on the front end of said wires I provide a carriage bar 31 having V shaped notches 32 that fit over said wires when said carriage bar is raised so that when said carriage bar is moved toward the rear end of the machine it will carry with it any blocks that have been placed on the forward ends of said wires. The ends of the carriage bar 31 are secured to links 33 that are connected by pivots 34 with blocks 35 on drive chains 36, said mechanism being in duplicate on both sides of the frame. Tension springs 37 connected with upwardly extending arms 38 of links 33 tend to yieldingly urge carriage bar 31 downwardly at all times.

A roller 40 is provided on each end of carriage bar 31, said rollers being adapted to pass under the cam member 30 and thereby control the raising and lowering of the gate 25.

A trackway 41 is provided on each side of the platform 11 to support the ends of the carriage bar 31 as said bar is moved lengthwise of platform 11. Raised portions 42 are provided on said trackways opposite the end of the member 21 on which the wires rest to raise the carriage bar 31 over said member 21 as said carriage bar passes this point.

When the carriage bar 31 is in the inoperative position shown in Figs. 1, 2 and 3 it will rest upon two bell crank shaped supports 43 that are both rigidly secured to a transverse shaft 44. One end of the transverse shaft 44 is connected with bell crank arm 45 which is urged by tension spring 46 in the proper direction to tend to lift bell crank supports 43. When the weight of the carriage bar 31 is on said supports 43 the tension of the spring 46 will be overcome and the supports 43 together with the carriage bar 31 will drop by gravity into the position shown in Figs. 2 and 3. The horizontal end of the bell crank lever 45 rests upon the end of another bell crank lever 47 that is fulcrumed at 48 and is adapted to be engaged by a cam 49 on a shaft 50 which carries the sprocket wheels 51 on which the link belts 36 are disposed. A tension spring 51' is connected with the bell crank 47 and tends to always hold the bell crank 47 in engagement with the bell crank 45.

The link belts 36 pass around suitable sprocket wheels 52 that are secured on a shaft 53' at the rear end of the frame 10. The shaft 52 is provided with a gear wheel 53 arranged to mesh with another gear wheel 54 on a shaft 55 that is shown directly below shaft 53, the gear wheel 54 being indicated by broken lines in Fig. 2. The shaft 55 is provided with two belt wheels 56 and 57 that are loosely mounted on said shaft and have clutch elements 58 on their inner sides which clutch elements are adapted for the reception of cones 60 on a member 61 that is preferably splined on the shaft 55 and is adapted to be moved lengthwise on said shaft by a bell crank shifter member 62 which is pivoted at 63 and connected by operating rod 64 with lever arm 65 or equivalent device at the head end of the machine.

The belt wheel 56 may be driven by a straight belt 66 in one direction while the belt wheel 57 may be driven by a twisted belt 67 in the opposite direction, hence clutch member 61 may be rotated in one direction by engagement with the belt wheel 56 and in the opposite direction by engagement with belt wheel 57.

A trough or tray 68 may be provided at the forward end of the machine for reception of the rubber blocks 22 that are used in making the mats.

In the operation of this machine the blocks 22 are placed by hand on the ends of the wires 20, as shown in Figs. 1 and 2 when the carriage bar 31 is in the lowered position. After a desired number of said blocks have been so placed the operator, by movement of lever 65, may engage the proper clutch 58 and start the movement of link belts 36. The first movement imparted to link belts 36 will turn shaft 50 thus causing cam 49 to move bell crank 47 which will move bell crank 45, thereby rotating shaft 44 and raising the supports 43 together with the carriage bar 31 into the position shown in Fig. 4, said carriage bar necessarily being moved inwardly as it is raised and the notches 32 in said carriage bar fitting over the ends of wires 20. Further movement of link belts 36 will move carriage bar 31 onto the trackways 41 and will cause rollers 40 to engage with cams 30 thus beginning to lift the gate 25. As the carriage bar 31 is moved inwardly it will pass over raised portions 42 thus lifting said carriage bar clear of the wire supporting member 21. At the same time the rollers 40 will have lifted the gate 25 clear of the carriage member 31 thus allowing said carriage member to pass under the gate 25 and over the member 21 and carry the blocks 22 inwardly. The carriage member is then caused to move toward the wire supporting bar 12 far enough to bring the blocks that are carried by said carriage member against said wire supporting bar or against the other blocks 22 of the partly finished mat, whereupon said carriage bar is stopped and its direction of movement reversed by reversing engagement with clutch 61 thus moving the carriage bar back toward the front end of the machine where it passes under the gate 31 and finally drops off of trackways 41 onto supports 43, whereupon the weight of the carriage bar causes it to move downwardly into the position shown in Fig. 1.

The wires 20 necessarily form a part of every finished mat.

When a mat is completed the wire holding bar 12—13 is unbolted, the mat is removed a new set of wires are inserted, the screws 16 are tightened, the wire holding bar is adjusted into the desired position so as to bring the ends of the wires just far enough out to the front of the machine that they will be caught by the carrier bar 31 when it is raised and said wire holding bar is then bolted tightly to the platform 11.

Any desired number of blocks 22 may be placed by hand on the ends of the wires 20 at one time. I find, however in practice, that if too many of said blocks are placed on the wires at one time there will be a tendency for the blocks to bind with a consequent danger of bending the wires. After the blocks are thus placed they are quickly and easily moved into position by the carriage bar.

This machine saves a great deal of time and labor, as obviously it is tedious and slow work to place the blocks 22 on the wires and move the same singly and by hand into their proper positions in the mat.

The foregoing description and accompanying drawings clearly disclose a preferred embodiment of my invention but it will be understood that this disclosure is merely illustrative and that such changes in the same may be resorted to as are within the scope and spirit of the following claims.

I claim:

1. In a mat making machine, a frame, a plurality of wires arranged to be supported on said frame in spaced apart, horizontal, parallel relation and a carriage bar movable lengthwise along said wires and arranged to be lowered clear of said wires at the forward end of said frame.

2. In a mat making machine, a frame, a plurality of wires arranged to be supported on said frame in spaced apart, horizontal, parallel relation and a carriage bar movable lengthwise along said wires and arranged to be lowered clear of said wires at the forward end of said frame, said carriage bar having V shaped notches arranged to receive said wires when said carriage bar is in a raised position.

3. In a mat making machine, a frame, a plurality of wires arranged to be supported on said frame in spaced apart, horizontal, parallel relation, a rest for the forward ends of said wires, a vertically movable gate arranged to position the forward ends of said wires, a carriage bar movable lengthwise along said wires and arranged to be lowered at the forward ends of said wires, means for moving said carriage bar and automatic means for raising said gate to permit said carriage bar to pass thereunder.

4. In a mat making machine, a frame, a plurality of wires arranged to be supported on said frame in spaced apart, horizontal parallel relation, a rest for the forward ends of said wires, a vertically movable gate arranged to position the forward ends of said wires, a carriage bar movable lengthwise along said wires, and arranged to be lowered at the forward ends of said wires, raising and lowering means for receiving and supporting said carriage bar at the forward end of said wires, means for moving said carriage bar and automatic means for raising said gate to permit said carriage bar to pass thereunder.

5. In a mat making machine, a frame, a plurality of wires arranged to be supported on said frame in spaced apart, horizontal parallel relation, a vertically movable gate arranged to position the forward ends of said wires, cam members on the outer ends of said gate, a carriage bar movable lengthwise along said wires and arranged to be lowered at the forward ends of said wires, means for moving said carriage bar, and rollers carried by the ends of said carriage bar for engaging the cam members on said gate to raise said gate.

6. In a mat making machine, a frame, a plurality of wires arranged to be supported on said frame in spaced apart, horizontal parallel relation, a rest for the forward ends of said wires, a vertically movable gate arranged to position the forward ends of said wires, a carriage bar movably lengthwise along said wires and arranged to be lowered at the forward ends of said wires, means on said carriage bar for raising said gate to permit said carriage bar to pass thereunder, trackways at the sides of said machine for supporting said carriage bar for movement and raised portions in said trackways arranged to lift said carriage bar over said rest for the forward ends of said bars.

In witness whereof, I hereunto subscribe my name this 10th day of December, A. D., 1925.

PETER J. SWANSON.